Dec. 29, 1942.    J. A. ZUBLIN    2,306,683
CUTTING EDGE
Filed July 1, 1940

INVENTOR.
JOHN A. ZUBLIN
BY James T. Bethell

Patented Dec. 29, 1942

2,306,683

UNITED STATES PATENT OFFICE 2,306,683

CUTTING EDGE

John A. Zublin, Los Angeles, Calif.

Application July 1, 1940, Serial No. 343,371

5 Claims. (Cl. 255—71)

This invention pertains to earth boring tools, and particularly to those which involve cutters which rotate with respect to the tool shank as the tool is rotated in the bore being produced.

There are at present many designs of cutters in use in the drilling and reaming of bores for oil wells and the like, and of that class known as roller cutters there are also many different types; all, however, involving some sort of cutting edges fixed to a cutter revolving under the influence of the formation being cut, as the bit rotates in the bore being produced. In order that the cutter rotate, it is necessary that it develop considerable traction on the formation being cut, and it is of course necessary that there be penetration before the cutter can remove the formation. As the edge of the cutter must have a certain thickness for mechanical reasons, it has been proposed to provide notches in those edges which are comparatively long, to assist in penetration. This works very well, except for the fact that providing notched edges on the cutter teeth decreases the total amount of effective tooth edge, and thus decreases the total cutting capacity of the cutter.

Disc cutters, i. e., those which have their cutting edges in the form of comparatively thin discs perpendicular, or nearly so, to the axis of rotation of the cutter, are particularly troublesome in attempting to get sufficient penetration to turn and remove the formation, especially when the cutters are new. Attempts to overcome this deficiency, by use of notched edges, are effective to a certain extent, but if the notches are sufficiently deep they decrease the available cutting edge, and if shallow or narrow soon wear off and leave the tooth without sufficient roughness to give the desired penetration and traction. It has been proposed to apply the hardfacing to the disc in a discontinuous fashion, leaving the disc free of hardfacing in spaced intervals, so that the hardfacing will project from the edge of the disc as wear on the disc continues, the portions to which the hardfacing is not applied being naturally softer and susceptible to wear. This expedient involves very careful welding, and results in a lesser amount of hardfacing being used on a given cutter, which in turn decreases the total cutting ability of the cutter.

With the above defects in the known forms of cutter in mind, it is an object of the present invention to provide means for increasing the traction and efficiency of rolling cutters.

It is a further object of this invention to provide a cutting edge which is discontinuous without decreasing the amount of hardfacing applicable to the cutter edge.

It is a further object of this invention to provide a cutting edge which is discontinuous and tends to maintain its discontinuity as it wears.

It is a further object of this invention to provide a cutting edge which will tend to remain discontinuous without the necessity of special application of hardfacing material.

Other objects and advantages will become apparent as the description proceeds.

Referring now to the drawing.

Figure 1:
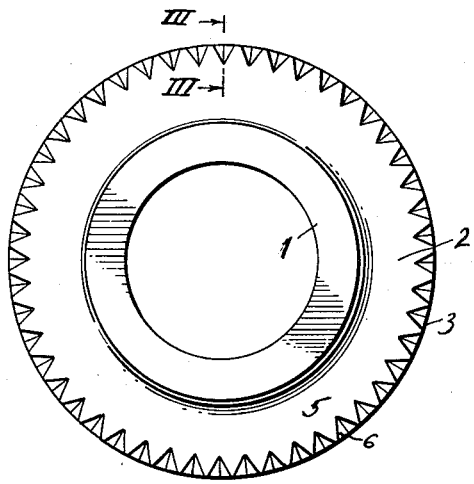
Figure 1 is an end view of one form of disc cutter embodying the present invention.
Figure 2:
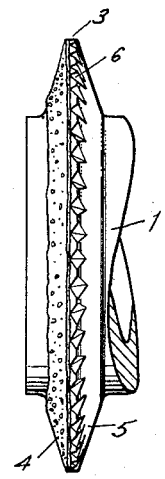
Figure 2 is an edge view of the cutter of Figure 1.

The cutter shown in Figures 1 and 2 consists of a body 1 provided with a disc 2, the edge 3 of which is adapted to penetrate and cut the formation and cause removal thereof. As shown in Figure 2, one side of the disc is supplied with a suitable hard material 4, extending from the edge inwardly to the required distance. This hard material can be any of the hard materials used in facing drilling tools, such as tungsten carbide, and may be applied in any manner desired, the simplest method being, perhaps, the welding on of the carbide by means of a flame or arc. The carbide may be in any form desired, the illustrated form being particles, held in a matrix of softer and lower melting material, which may be, if desired, the base metal of the cutter. The carbide may be continuous, as shown, or in the form of spaced pads, but the present invention is specifically adapted to the use of carbide in continuous form, as will appear later.

The opposite side 5 of the disc from the side containing the hard metal 4 has its edge ground off in spaced intervals to produce notches 6. If desired, these notches may be formed by milling, chipping with a chisel, or even by hammer blows, or any other means, but grinding is the most convenient and rapid method, and therefore preferred.

Figure 3:
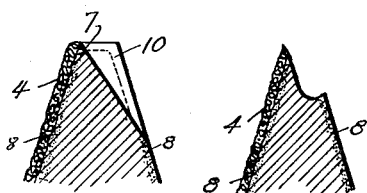
Figure 3 is a cross-section, greatly enlarged, of a portion of Figure 1, on line III—III thereof.

The above description is of the external appearance of the cutter, but there are internal characteristics which give it its characteristic cutting effects and which result from the method of manufacture. In my patent of June 2, 1936, No. 2,043,142, there is described a method of improving the wear resistant qualities of a body, which results in the formation of a cutting edge having a hard carburized layer under the carbide layer, and on the entire surface of the cutter. If the patented process be applied to the instant cutter, a hard case would be formed, extending down into the notches 6. This, however, would give too thin sections at the points where the notches approach the hardfacing, as point 7 of Figure 3. The hardcasing would extend over the faces of the cutter, as shown by the dotted areas 8, and down into the notches 6. Such a thin section as that present at point 7, if composed of hardcase material, would be too brittle for satisfactory support of the carbide at that point, resulting in breaking of the carbide, and consequent loss of efficiency of the cutter. In the practice of the present invention it is proposed to caseharden the cutter before the cutting of the notches. The order of the other steps is immaterial, it being understood, of course, that if the casehardening be applied before the hardfacing, that the casehardening will extend down behind the carbide, as described in the patent, or, if the hardening be practiced after the attachment of the hardfacing, such will not be true. The principle of the present invention will not be changed by such variation in procedure. The dotted line 10 shows the extent of the case when the notches are produced after casehardening. It is to be further understood that other methods of surface hardening may be practiced, such as Chapmanizing, nitriding, cyaniding, flame hardening, or inductive hardening, all of which have the common characteristic of producing a case or surface harder than the body of the object treated.

Figure 4:
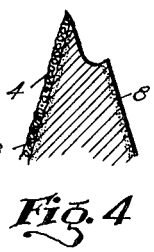
Figure 4 is a view, corresponding to Figure 3, of a cutter after considerable wear.

If a cutter, manufactured in accordance with the above procedure, be run in a drilling operation it will be found that it turns very readily, and cuts properly in the formation. As the cutter wears, the softer exposed portions in the notches 6 will wear more rapidly than the hard areas left on the edge 3 of the cutter, thus tending to preserve the toothed character of the edge 3. However, the edge 3 wears down in time, but, due to the presence of the carbide layer 4, does not wear flat, but in the form of a chisel edge, much as shown in Figure 4. This form of edge is very efficient in removing the formation, but is so delicate that it cannot be run at the beginning of the run after the bit is first inserted in the bore. It is found, further, that the edge shown in Figure 4 is capable of properly removing the formation without special precautions being taken to insure a toothed edge, probably because the carbide, being thin, and composed of irregular grains of hard material imbedded in softer material, forms its own irregular edge, which, due to the increased penetration secured by the thinness of the edge, causes sufficient penetration to enable the cutter to rotate and properly remove the formation.

Figure 5:
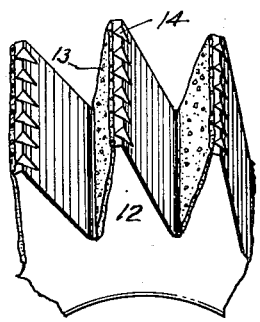
Figure 5 is a view of the teeth of another form of cutter embodying the present invention.

In Figure 5 is shown the invention applied to a tooth of a toothed cutter, as distinguished from a disc cutter. The same principles of manufacture and operation are involved, but in this instance the chief cause of the increased efficiency of the cutter is the increased penetration, caused by the reduction of the tip area of the tooth, enabling it to penetrate farther into the formation, as distinguished from the combination of reduction of area and jagged edge of the form of Figure 1, assisting the cutter to turn. In the form of Figure 5, a tooth 12 is provided with a layer of hard material 13, such as carbide, on one side, and the other side is formed with the notches 14, exactly as described in connection with Figure 1. The wearing of the tooth is similar to the wearing of the disc of Figure 1, and need not be further described.

It is to be understood that the above method of manufacture and principle of construction can be applied to the various other forms of cutters as well as to those mentioned; for instance, it is applicable to spiral cutting edges, or cutting teeth, such as are found in various roller cutters and reamers.

The above description is intended to be illustrative only, and not limitative, as the scope of the invention is best understood from the appended claims.

I claim:
1. A cutting element for earth boring tools having a cutting edge; said cutting element having a welded on layer of hard, wear resisting material extending from said cutting edge, a hardened case extending over said edge of the cutting element, and having a series of notches at said cutting edge extending through the hardened case.

2. A cutting element for earth boring tools having a cutting edge; said element having a welded on layer of hard, wear resisting material extending from said cutting edge on one side thereof, a hardened case extending over the cutting element, and having a series of notches at the cutting edge on the other side of said element from said layer of hard, wear resisting material, said notches extending through the hardened case.

3. A cutting element for earth boring tools having a cutting edge; said element having a welded on layer of hard, wear resisting material extending from said cutting edge on one side thereof, and having a hardened case extending over at least the portions of the element uncovered by the layer of hard, wear resisting material, said hardened case being interrupted at spaced intervals along the cutting edge.

4. A disc shaped cutting element for earth boring tools having a cutting edge on the periphery of said disc, a welded on layer of hard, wear resisting material extending over one side of said disc from the edge thereof, a hardened case extending over the surface of said cutting element in at least the portions of said cutting element not covered by said layer of hard, wear resisting material, and a series of notches in the cutting edge extending through said hardened case.

5. A disc shaped cutting element for earth boring tools having a trapezoidal cross-section, the shorter of the parallel sides of said trapezoid forming the cutting edge of said cutting element, a welded on layer of hard, wear resisting material on one side of said disc shaped cutting element extending to the cutting edge thereof, a series of notches extending across the cutting edge of said disc shaped cutting element, and a hardened case at the surface of said cutting element in at least the portions thereof not covered by said layer of hard, wear resisting material, and spaced from the bottom of said notches.

JOHN A. ZUBLIN.